United States Patent Office 2,989,461
Patented June 20, 1961

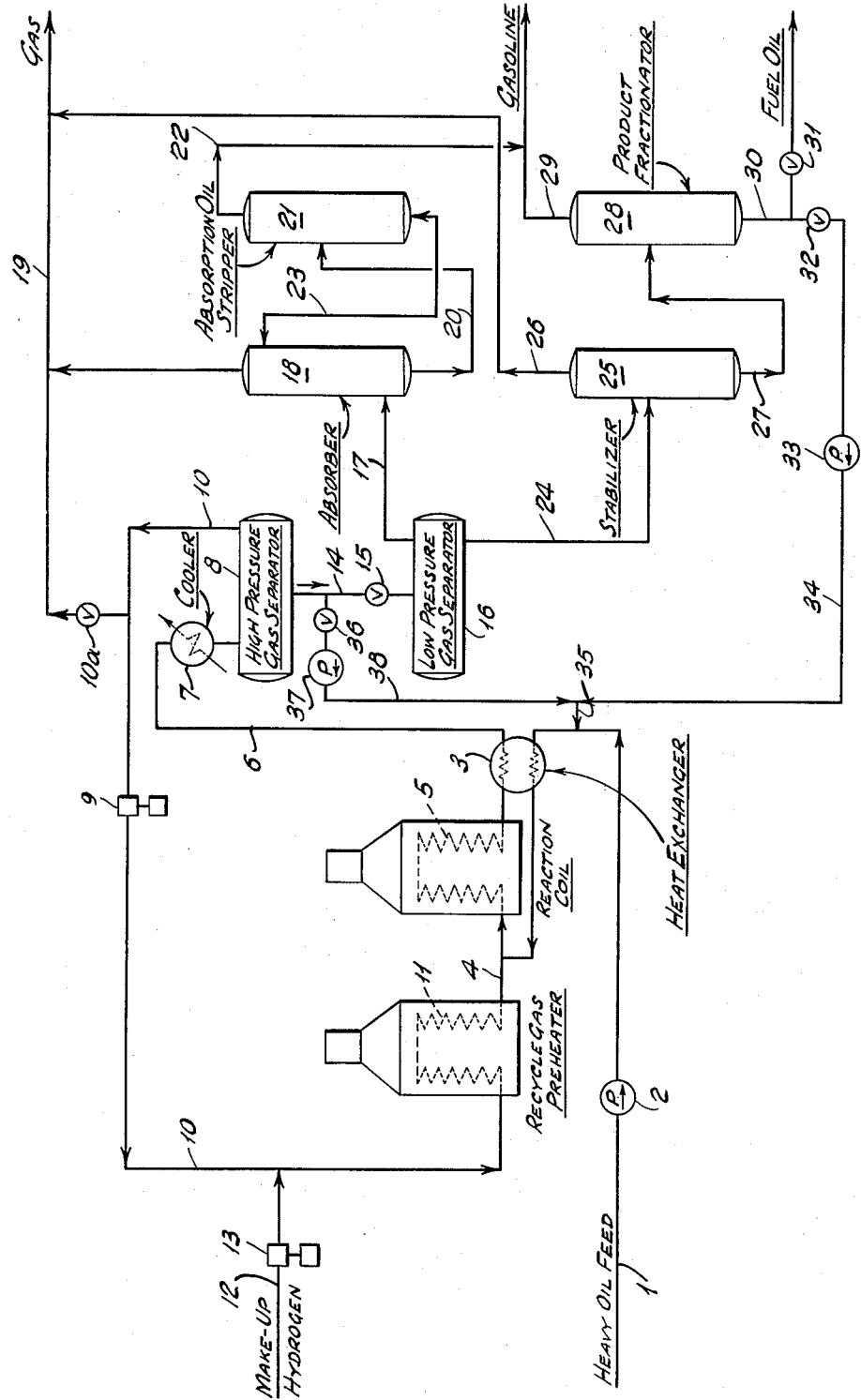

2,989,461
CONVERSION OF HYDROCARBONS WITH TURBULENT FLOW, IN THE PRESENCE OF HYDROGEN
Du Bois Eastman, Whittier, and Warren G. Schlinger, Pasadena, Calif., assignors to Texaco Inc., a corporation of Delaware
Filed June 5, 1958, Ser. No. 740,138
11 Claims. (Cl. 208—107)

This invention relates to the hydroconversion of hydrocarbons. More particularly, it relates to the apolymeric hydroconversion of liquid hydrocarbons by contacting the liquid hydrocarbon with a gas containing hydrogen under conditions of turbulent flow and at temperatures and pressures to convert at least a portion of the liquid hydrocarbon into more valuable products.

In the hydroconversion processess of the prior art the yields of desirable lighter products have been unsatisfactory whereas yields of undesirable products such as high polymers and coke have been uneconomically high. The destructive or splitting type of conversion can be likened to viscosity breaking, a mild thermal process generally carried out at temperatures of about 935° F. and pressures of about 50 p.s.i.g. Deeper conversion by thermal cracking results in the formation of large amounts of high polymers and coke, particularly in the case of heavy petroleum oils which are liquid or a portion thereof is liquid at reaction conditions. In these latter instances hydrogen has been added to the thermal cracking process in an attempt to suppress the formation of high polymers and coke. However, even with the presence of hydrogen, prior art hydroconversion processes have still produced large amounts of high polymers and coke.

In the conventional hydroconversion of petroleum oils as practiced in Germany, the main or splitting reaction is carried out in large reactors which contain a heavy viscous phase through which relatively pure hydrogen is bubbled. The poor agitation in this system limited the rate at which the reaction could proceed and although the reaction was carried out under mild conditions, it was accompanied by the production of large amounts of high polymers and coke.

Apparently the reason for the production of the undesirable high polymers and coke, even when hydrogen is added, is that the hydrogen does not reach the site of the reaction in sufficient amounts to react with the active fragments produced by the cracking and as a result the active fragments inter-react to form polymers. When deeper conversion, as by thermal cracking is attempted at higher temperatures, it has been the practice in prior hydroconversion processes to increase the hydrogen concentration in the reaction zone. However, the increased hydrogen concentration has not rendered prior hydroconversion processes satisfactory because, as the temperature is increased, the rate of cracking increases more rapidly than does the rate of solution or diffusion of the hydrogen into the hydrocarbon and consequently even at higher hydrogen concentrations, the cracking reaction proceeds more rapidly than the hydrogen can dissolve or diffuse to the reaction site to react with the active fragments of cracking. As a result, although the overall concentration of the hydrogen in the reaction zone may be high there are many areas in the reaction zone where there is a local deficiency of hydrogen either because it has never reached that particular area or because it has been consumed but not replaced, and consequently the formation of polymers is not prevented in the hydroconversion processes of the prior art.

One method of effecting the apolymeric hydroconversion of a liquid hydrocarbon is to subject the hydrocarbon in intimate mixture with a gas containing hydrogen to conditions of highly turbulent flow at elevated temperatures and pressures. Such conditions may be obtained by flowing the reactants at high velocities as a confined stream through a coil or tubular conduit.

The apolymeric hydroconversion is effected at temperatures between 800 and 1500° F., preferably between about 900 and 1100° F. Superatmospheric pressures ranging from 500 to 20,000 p.s.i.g. and higher may be employed. Satisfactory results have been obtained using pressures of 1000 to 10,000 p.s.i.g. Residence times of from 5 seconds to 2 hours or longer may be used. Preferably the residence time ranges from about 20 to about 200 seconds. Recycle gas rates of at least 1000 cubic feet per barrel of feed may be employed although rates of 2,000 to 100,000 cubic feet per barrel of feed are preferred. It is desirable for the recycle gas to have a high hydrogen concentration, but hydrogen concentrations as low as 25 volume percent may be employed.

In our copending application Serial No. 577,027 filed April 9, 1956, now abandoned, of which this is a continuation-in-part, there is described a method for the conversion of hydrocarbon oils by contacting the oil with hydrogen under conditions of turbulent flow.

In the described method, it is disclosed that oil feed rate, hydrogen recycle rate, reaction coil diameter, and operating conditions of temperature and pressure all tend to affect velocity of flow and turbulence. It was found convenient to express turbulence in terms of the ratio of the average apparent viscosity of the flowing stream, $\bar{\epsilon}_m$, to the molecular or kinematic viscosity $\nu$, vis, $$\frac{\bar{\epsilon}_m}{\nu}$$

and to refer to this ratio $$\frac{\bar{\epsilon}_m}{\nu}$$

as turbulence level. The apparent viscosity of the flowing stream $\epsilon_m$, equals the sum of the eddy viscosity, $\epsilon_m$, and the kinematic viscosity $\nu$ which may be shown by the expression $\epsilon_m = \epsilon_m + \nu$. Under conditions of turbulence, $\epsilon_m$ has a finite value and it is apparent that if the magnitude of the apparent viscosity exceeds the kinematic viscosity at the point in question, the ratio of $$\frac{\epsilon_m}{v}$$

exceeds unity. For a given turbulence system, it follows that the average value of the ratio, as expressed by $$\frac{\bar{\epsilon}_m}{\nu}$$

exceeds unity. The average apparent visocity, $\bar{\epsilon}_m$ as employed herein is defined by the equation $$\bar{\epsilon}_m = \frac{1}{r_0}\int_0^{r_0} \epsilon_m dr$$

where $r_0$ is the radius of the conduit. By substitution and integration, employing the parameters described by Corcoran et al., Industrial and Engineering Chemistry, Volume 44, page 410 (1952), this expression $$\bar{\epsilon}_m = \frac{1}{r_0}\int_0^{r_0} \epsilon_m dr$$

may be written $$\bar{\varepsilon}_m = \frac{r_0}{15}\sqrt{\frac{r_0 g}{2\sigma}\cdot\frac{dp}{dx}}$$

The later equation is in terms which may be readily determined for a given system. In the foregoing, $d$ represents differential; $g$ represents acceleration of gravity, feet per second, per second; $p$ represents pressure, pounds per square foot; $r_0$ represents radius of conduit in feet; $x$ represents distance, feet; $\varepsilon_m$ represents eddy viscosity, square feet per second; $\bar{\varepsilon}_m$ represents apparent viscosity, square feet per second; $\bar{\varepsilon}_m$ represents average apparent viscosity, square feet per second; $\nu$ represents kinematic viscosity, square feet per second; and $\sigma$ represents specific weight, pounds per cubic foot. Turbulence levels of at least 25 may be employed but turbulence levels of 50 to 1000 are preferable.

In the above described process, the hydrocarbon feed is intimately mixed with the hydrogenating gas and the intimate mixture of hydrogen and hydrocarbon enables the hydrogen to reach quickly the active centers formed by cracking. By reducing the distance the hydrogen must dissolve or diffuse into the hydrocarbon, the hydrogenation of these active centers is effected smoothly and the formation of polymers is suppressed. When lighter oils are used as the feed stock, the oil may be in the vapor state under reaction conditions. When the feed stock is a heavy oil in some cases it or a portion thereof remains liquid under reaction conditions and consequently in this latter instance two phases are present in the reaction zone.

When two phases flow through the same conduit, it is possible to have several types of flow. These various types are stratified flow, wave flow, plug flow, slug flow, annular flow, bubble flow or froth flow and dispersed or spray flow and are described by Baker in the Oil and Gas Journal, July 26, 1954, page 185, et seq. In the present specification and appended claims the term "intimate mixture" is intended to exclude two-phase flows of the stratified, wave, plug, slug, and annular type.

Any hydrocarbon liquid such as vacuum residuum, kerosene, straight run gas oil, thermally cracked gas oil, fluid catalytically cracked cycle gas oil, whole crude, shale oil, tar sand oil, straight run gasoline and the like may be satisfactorily treated by the process of the present invention.

According to the process of the present invention, the flow of materials in the reaction zone is maintained at velocities high enough that both the hydrogen and the hydrocarbon pass through the reaction zone under conditions of turbulent flow. Such velocities may be readily obtained by passing the hydrocarbon and the hydrogen through an elongated passageway, for example, a coil or tubular reactor. Under these conditions the hydrogen can react with the active fragments of cracking as soon as they are formed and the allowable rate of reaction can be correspondingly increased while still suppressing the formation of polymers. By the use of our novel process, the hydrogenation reaction may be accelerated so that the major fraction of the hydrocarbon feed may be converted to lower boiling products at conversion levels and temperatures not heretofore possible. We have found that when the turbulence level as represented by the ratio $$\frac{\bar{\varepsilon}_m}{\nu}$$

is at least 25, it is possible to conduct destructive hydrogenation reactions at high conversion levels without the formation of high boiling polymers or coke.

One advantage of the process of this invention is that it accelerates the rate of hydrogenation in a combined hydrogenation and cracking process so that the formation of polymers, gas and coke is suppressed at high conversion levels.

Another advantage of this process is that motor fuel fractions of higher octane number can be produced from heavy hydrocarbon oils than has heretofore been possible by hydrogenation.

Another advantage of this process is that higher conversion of hydrocarbon oils to useful lower boiling products are possible than with cracking or conventional hydrogenation.

Another advantage of this process is that it permits the conversion of heavy residual oils, which would otherwise only be useful in residual fuel, to motor fuel of high quality.

A further advantage of this process is that the rapid reaction achieves high conversions in a relatively short processing time. This short reaction time requires a relatively small reaction volume and the necessary volume may be obtained readily by employing tubular or coil type reactors. Such coil type reactors are relatively inexpensive in comparison with conventional high pressure hydrogenation reactors. Because of the small diameter of the tube, minimum wall thickness is required. This advantage is particularly important when employing expensive alloys and alloys which are difficult to fabricate into large vessels.

Another advantage of this process is that a large part of the conversion obtained is a result of splitting and only that amount of hydrogen is consumed which is required to saturate the active fragments produced to prevent polymer and coke formation. This results in a relatively small consumption of hydrogen although high conversions to lower boiling products are obtained.

The accompanying drawing diagrammatically illustrates the process of this invention. Although the drawing illustrates one arrangement of apparatus in which the process of this invention may be practiced, it is not intended to limit the invention to the particular apparatus or material described. A heavy oil feed from an external source, not shown, is introduced into the system through line 1 by means of pump 2. The oil feed is preheated by heat exchange with the reaction coil effluent in heat exchanger 3 and combined with preheated hydrogen-containing gas from preheater coil 11 in line 4. The combined oil and gas are then passed through heated reaction coil 5 at high velocity so that a condition of turbulent flow is obtained. The effluent from reaction coil 5 is cooled in heat exchanger 3 and transferred through line 6 to cooler 7 and high pressure gas separator 8. In high pressure gas separator 8, hydrogen-rich gas is separated and recycled by compressor 9 through line 10 to recycle gas preheater coil 11. If desired, the concentration of hydrogen in the recycle gas may be increased by purging a portion of the gas from line 10 through valve 10A and line 19. Make-up hydrogen to supply the hydrogen consumed by reaction with the oil feed and to replace the hydrogen removed from the system in the purge gas or dissolved in the liquid withdrawn from high pressure separator 8 is supplied from an external source, not shown, through line 12 by means of compressor 13 which discharges into recycle gas line 10. Hydrogen for this process may be provided advantageously by the partial oxidation of natural gas, by-product gas or heavy oils, by the utilization of by-product hydrogen from catalytic reforming, or by other well-known processes for the production of hydrogen. The heavy oil fraction boiling above motor fuel produced by the process of this invention may be advantageously used to supply at least a portion of the hydrogen required by conversion of the oil to hydrogen by partial combustion with oxygen.

The liquid phase from high pressure separator 8 is withdrawn through line 14 and valve 15 and is discharged to low pressure gas separator 16. The pressure is reduced as the liquid flows through valve 15 and make-gas is flashed from the liquid in the low pressure separator. Gas from low pressure separator 16 is withdrawn through line 17 and contacted with an absorption oil in absorber 18. Absorber 18 is employed to separate components boiling in the range of gasoline from the make-gas before discharging this gas through line 19 for fuel or other use. Rich absorption oil is withdrawn from absorber 18 through line 20 and is stripped in absorption oil stripper 21. Hydrocarbons stripped from the absorption oil in stripper 21 are withdrawn through line 22 and combined with gasoline product. Stripped absorption oil from stripper 21 is withdrawn through line 23 and is charged to absorber 18.

The liquid phase from low pressure separator 16 is withdrawn through line 24 and is transferred to stabilizer 25. Stabilizer 25 is employed to separate normally gaseous hydrocarbons dissolved in the liquid product. The stabilizer off-gas is withdrawn through line 26 and is discharged with the gas in line 19 for fuel or other uses. The stabilized liquid from stabilizer 25 is withdrawn through line 27 and transferred to product fractionator 28. Fractionator 28 is employed to separate hydrocarbons boiling in the range of gasoline from heavier oils. Gasoline is discharged from fractionator 28 through line 29, combined with the recovered gasoline in line 22, and discharged to external storage, not shown. Heavy hydrocarbons from product fractionator 28 are withdrawn through line 30 and may be discharged through valve 31 to external tankage, not shown. In the alternative, this heavy oil product may be withdrawn through line 30, valve 32 and recycled by means of pump 33 and lines 34 and 35 to heavy oil feed line 1. In some circumstances, it may be desirable to employ another alternative by which gasoline boiling hydrocarbons as well as the heavy oil product may be recycled. In this case, the liquid from the high pressure separator 8 in line 14 is withdrawn through valve 36 and is recycled by pump 37 through lines 38 and 35 to heavy oil feed line 1. In another recycle modification, reaction coil effluent may be passed to a hot separator, not shown, in which a partial separation is made between heavy hydrocarbons and uncondensed vapors and gases. This hot separator liquid comprises the heavier hydrocarbons in the liquid product and can be advantageously recycled to the reaction coil inlet for conversion to additional quantities of lower boiling hydrocarbons.

In the alternative the recycle gas stream may be purified by means, not shown, such as, amine scrubbing for the removal of hydrogen sulfide or oil scrubbing for the removal of gaseous hydrocarbons.

The following example describes one embodiment of the process of this invention.

EXAMPLE I

A heavy crude oil having an API gravity of 12.9°, Conradson carbon residue of 9.5 wt. percent and an ash content of 0.035 weight percent is hydrogenated at 8300 p.s.i.g., 959° F., and with a reaction time of 31 seconds. A gas containing 85 mol percent hydrogen is recycled at a rate of 41,300 cubic feet per barrel of feed. Turbulent flow conditions are maintained such that the turbulence level expressed by $$\frac{\xi_m}{\nu}$$

is 192. Yields and tests on the feed and products are shown in Table I. Tests on the total product as well as tests on the motor fuel fraction and the heavy oil boiling above motor fuel which are obtained by redistillation of the total product are shown.

*Table I*

| Yields | Wt. Percent Total Feed | Vol. Percent Oil Feed |
|---|---|---|
| Feed: | | |
| Oil | 99.0 | 100.0 |
| Make-up Hydrogen (655 cu. ft./bbl.) | 1.0 | |
| | 100.0 | |
| Products: | | |
| Dry Gas | 20.4 | |
| Butane Retention 400° F. End-Point Motor fuel | 44.5 | 52.9 |
| Heavy Oil Boiling Above Motor Fuel | 35.1 | 39.6 |
| | 100.0 | 92.0 |

| Feed and Product Quality | Feed | Total Product | Motor Fuel Fraction | Heavy Oil Boiling Above Motor Fuel |
|---|---|---|---|---|
| Gravity, ° API | 12.9 | 28.4 | 55.8 | 8.9 |
| Wt. Percent Sulfur | 1.96 | 1.16 | 0.50 | 1.44 |
| Wt. Percent Nitrogen | 0.70 | | | |
| Bromine Number | | 40 | 44 | 40 |
| Carbon Residue (Conradson) | 9.5 | | | 4.7 |
| Ash Wt. Percent (filtered) | 0.035 | 0.002 | | 0.006 |
| Viscosity SUS 122° F | | | | 57 |
| Distillation (ASTM): | | | | |
| IBP | | | | 98 |
| 10% | | | | 146 |
| 30% | | | | 196 |
| 50% | | | | 242 |
| 80% | | | | 290 |
| 90% | | | | 360 |
| EP | | | | 410 |
| Recovery | | | | 97.0 |
| Residue | | | | 1.0 |
| Octane Number: | | | | |
| ASTM Research, Clear | | | 80.9 | |
| ASTM Research, +3 cc. TEL/gal | | | 88.5 | |

When this same heavy crude oil is hydrogenated by the conventional hydrogenation process where the hydrogen is passed through a liquid phase in the presence of a catalyst in reactors wherein velocities are not sufficient to cause turbulent flow, the yields and product quality shown in Table II are obtained.

*Table II*

| Yields | Wt. Percent Total Feed | Vol. Percent Oil Feed |
|---|---|---|
| Feed: | | |
| Oil | 97.7 | 100.0 |
| Make-up Hydrogen (1,500 cu. ft./bbl.) | 2.3 | |
| | 100.0 | |
| Products: | | |
| Dry Gas | 11.7 | |
| Butane Retention 400° F. End-Point Motor Fuel | 21.9 | 30.6 |
| Heavy Oil Boiling Above Motor Fuel | 65.3 | 71.4 |
| Loss to Coke | 1.1 | |
| | 100.0 | 102.0 |

| Product Quality | Total Product | Motor Fuel Fraction | Heavy Oil Boiling Above Motor Fuel |
|---|---|---|---|
| Gravity, ° API | 33.5 | 58.4 | 23.2 |
| Wt. Percent Sulfur | | 0.15 | 0.46 |
| Octane, Number ASTM Research, Clear | | 63 | |

Differences between the process of the present invention and conventional hydrogenation are readily apparent in comparing the data in Tables I and II. The most striking difference is the high conversion and yield of low boiling hydrocarbons produced by the turbulent flow, hydrogenation process of this invention. A yield of 52.9 volume percent motor fuel is obtained in turbulent flow hydrogenation which is about double that obtained in conventional hydrogenation. In the latter case, the 30.6% yield of motor fuel is accompanied by the formation of 1.1% coke which indicates that substantially more severe operation would not be feasible with this type process.

A further difference between the two processes is shown in the quality of the motor fuel produced. Motor fuel produced by conventional hydrogenation of this heavy crude oil had an ASTM Research Octane of 63 compared with 80.9 which is obtained by the turbulent flow hydrogenation process of this invention.

A further difference is shown in the amount of hydrogen consumed by the two processes. In conventional hydrogenation of this crude oil, 1,500 cubic feet of hydrogen per barrel of feed are consumed when hydrogenating under conditions of severity resulting in the production of only 30.6 volume percent motor fuel. In this example of turbulent flow hydrogenation, 655 cubic feet of hydrogen per barrel of feed are consumed to yield 52.9 volume percent of motor fuel.

EXAMPLE II

In another example, a diesel fuel having a distillation range of 410 to 655 and containing 74.2 weight percent paraffins, 3.2 weight percent olefins and 22.6 weight percent aromatics is hydrogenated under turbulent flow conditions with the results shown in Table III.

Table III

| Test | A | B | C | D | E |
|---|---|---|---|---|---|
| Hydrogenation Conditions: | | | | | |
| Reaction Temperature, °F | 945 | 945 | 985 | 1,020 | 1,040 |
| Pressure, p.s.i.g | 4,400 | 4,500 | 4,430 | 4,340 | 4,310 |
| Radius of tubular reactor $r_0$, ft | 0.0130 | 0.0130 | 0.0130 | 0.0130 | 0.0130 |
| Specific Weight of flowing fluid at reaction temperature and pressure, $\sigma$, lbs./cu. ft | 7.85 | 3.73 | 4.12 | 5.31 | 5.41 |
| Pressure drop per unit of reactor length, $\frac{dp}{dx}$ lbs./sq. ft./ft | 146 | 170 | 168 | 173 | 168 |
| Molecular (kinematic) viscosity of flowing fluid, $\nu$, sq. ft./sec.×$10^5$ | 1.73 | 1.73 | 1.73 | 1.73 | 1.73 |
| Average apparent viscosity, $\bar{\epsilon}_m = \frac{r_0}{15}\sqrt{\frac{r_0 g}{2\sigma}\cdot\frac{dp}{dx}}$ sq. ft./sec.×$10^3$ | 1.73 | 2.69 | 2.56 | 2.28 | 2.23 |
| Turbulence level $\frac{\bar{\epsilon}_m}{\nu}$ | 100 | 156 | 148 | 132 | 129 |
| Hydrogen Recycle Rate, cu. ft./bbl | 6,900 | 12,300 | 12,200 | 8,430 | 8,390 |
| Recycle Hydrogen Purity, Vol. Percent | 65.5 | 89.6 | 82.3 | 76.3 | 74.1 |
| Yield of $C_4$ to 400° F. End-Point Motor Fuel, Vol. Percent Feed | 38.3 | 28.9 | 62.1 | 60.0 | 57.0 |
| Motor Fuel Quality: | | | | | |
| Octane Number, ASTM Research: | | | | | |
| Clear | 63.8 | 62.3 | 72.7 | 82.1 | 87.3 |
| with 3.0 cc. TEL/gal. | 80.4 | 79.6 | 86.2 | 92.5 | 95.5 |
| Hydrocarbon Type Analysis: | | | | | |
| Paraffins | 43.5 | 45.4 | 57.7 | 63.9 | 59.3 |
| Olefins | 43.8 | 45.9 | 27.6 | 17.4 | 14.3 |
| Aromatics | 12.7 | 8.7 | 14.7 | 18.7 | 26.4 |
| Gravity, °API | 57.5 | 59.5 | 60.9 | 60.9 | 55.2 |
| Distillation, ASTM: | | | | | |
| IBP °F | 106 | 104 | 88 | 88 | 94 |
| 10 | 170 | 158 | 128 | 112 | 132 |
| 50 | 288 | 280 | 236 | 206 | 211 |
| 90 | 383 | 369 | 360 | 354 | 348 |
| End-Point | 412 | 402 | 398 | 394 | 390 |

Table III shows that the diesel fuel fraction may be converted to motor fuel fraction in yields greater than 60 percent. To the applicants' knowledge, such conversion levels have not heretofore been obtained by any hydrocarbon conversion process for the conversion of heavy oils to motor fuel fractions. Attention is also directed to the high quality of the motor fuel fraction as shown by the octane number which in Test E is 87.3 clear and 95.5 when blended with 3.0 cc. of tetraethyl lead per gallon.

EXAMPLE III

A heavy cycle gas oil from fluid catalytic cracking is hydrogenated under turbulent flow conditions at 1025° F. to produce a motor fuel fraction having a clear ASTM Research Octane Number of 98. This example illustrates the high quality product which may be obtained by the process of this invention.

The examples as a group show the distinct difference between turbulent flow hydrogenation and conventional hydrogenation. They show the high quality product which may be obtained at high yields under various operating conditions. The examples further show that the process of this invention may be applied advantageously to the conversion of hydrocarbon oils ranging from kerosine and diesel fuels to crude oils and cycle stocks.

Obviously, many modifications and variations of the invention as hereinbefore set forth may be made without departing from the spirit and scope thereof and only such limitations should be imposed as are indicated in the appended claims.

We claim:

1. A method for the hydroconversion of a hydrocarbon liquid which comprises admixing said hydrocarbon liquid with a hydrogen containing gas and subjecting the resulting mixture to highly turbulent flow at a turbulence level as represented by the ratio $$\frac{\bar{\epsilon}_m}{\nu}$$

of at least 25 at a temperature of about 800 to 1500° F. and a pressure of at least 750 p.s.i.g. for a reaction time of between 5 seconds and 2 hours, said hydroconversion being accompanied by the consumption of hydrogen.

2. A method for the hydroconversion of a hydrocarbon liquid which comprises admixing said hydrocarbon liquid with about 1000 to 100,000 cubic feet of a gas containing hydrogen per barrel of hydrocarbon liquid and subjecting the resulting mixture to highly turbulent flow at a turbulence level as represented by the ratio $$\frac{\bar{\epsilon}_m}{\nu}$$

of at least 25 at a temperature of about 800 to 1500° F. and a pressure of at least 750 p.s.i.g. for a reaction time of between 5 seconds and 2 hours, said hydroconversion being accompanied by the consumption of hydrogen.

3. A method for the hydroconversion of a hydrocarbon liquid which comprises admixing said hydrocarbon liquid with about 2000 to 100,000 cubic feet of a gas containing hydrogen per barrel of hydrocarbon liquid and subjecting the resulting mixture to highly turbulent flow at a turbulence level as represented by the ratio $$\frac{\bar{\epsilon}_m}{\nu}$$

of between 50 and 1000 at a temperature of about 800 to 1500° F. and a pressure of about 750 p.s.i.g. to 10,000 p.s.i.g. for a reaction time of between 5 seconds and 200 seconds, said hydroconversion being accompanied by the consumption of hydrogen.

4. A method for the hydroconversion of a hydrocarbon liquid having a boiling range extending above about 420° F. which comprises admixing said hydrocarbon liquid with a hydrogen containing gas, subjecting the resulting mixture to highly turbulent flow at a turbulence level as defined by the ratio $$\frac{\bar{\epsilon}_m}{\nu}$$

of at least 25 at a temperature between 800 and 1500° and a pressure of at least 750 p.s.i.g. for a reaction time of between about 5 seconds and 2 hours, separating a gas containing unreacted hydrogen, recycling at least a portion of said gas containing unreacted hydrogen to provide at least a portion of the gas containing hydrogen admixed with the hydrocarbon liquid subjected to hydroconversion, separating a motor fuel fraction having a distillation end point less than about 430° F. and separating a heavy liquid fraction comprising hydrocarbons boiling above said motor fuel fraction, said hydroconversion being accompanied by the consumption of hydrogen.

5. The process of claim 4 in which the turbulence level as defined by the ratio $$\frac{\bar{e_m}}{\bar{v}}$$

is between about 50 and 1000.

6. A method for the hydroconversion of a hydrocarbon liquid which comprises passing an intimate mixture of said hydrocarbon liquid and a hydrogen containing gas as a confined stream through an elongated reaction zone at a turbulence level as defined by the ratio $$\frac{\bar{e_m}}{\bar{v}}$$

of at least 25 at a temperature between 900 and 1100° F., a pressure between about 750 and 10,000 p.s.i.g. for a reaction time of between 5 seconds and 200 seconds, said hydroconversion being accompanied by the consumption of hydrogen.

7. The process of claim 6 in which the turbulence level as defined by the ratio $$\frac{\bar{e_m}}{\bar{v}}$$

is between about 50 and 1000.

8. The process of claim 6 in which the flow of intimate mixture through the reaction zone is of the froth type.

9. The process of claim 6 in which the flow of intimate mixture through the reaction zone is of the dispersed type.

10. The process of claim 6 in which the hydrocarbon liquid comprises straight run gasoline.

11. The process of claim 6 in which the hydrocarbon liquid comprises a gas oil.

References Cited in the file of this patent

UNITED STATES PATENTS

| | | |
|---|---|---|
| 1,888,998 | Mercier | Nov. 29, 1932 |
| 1,942,191 | Steere | Jan. 2, 1934 |
| 2,007,226 | Szayna | July 9, 1935 |
| 2,014,350 | Ayres | Sept. 10, 1935 |
| 2,207,494 | Viktora | July 9, 1940 |
| 2,381,522 | Stewart | Aug. 7, 1945 |
| 2,698,830 | Jenny | Jan. 4, 1955 |